(12) United States Patent
Burnet et al.

(10) Patent No.: US 9,924,463 B2
(45) Date of Patent: Mar. 20, 2018

(54) METHOD, SYSTEM AND APPARATUS FOR CONTROLLING POWER CONSUMPTION OF A MOBILE TERMINAL

(71) Applicant: MediaTek Singapore Pte. Ltd., Singapore (SG)

(72) Inventors: Craig Burnet, Hertfordshire (GB); Timur Kelin, Cambourne (GB); Chia-Chun Hsu, New Taipei (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/250,899

(22) Filed: Aug. 29, 2016

(65) Prior Publication Data

US 2016/0374025 A1    Dec. 22, 2016

(51) Int. Cl.
*H04W 52/02* (2009.01)
*H04W 4/02* (2018.01)

(52) U.S. Cl.
CPC ......... *H04W 52/0251* (2013.01); *H04W 4/02* (2013.01); *H04W 52/028* (2013.01); *Y02B 60/50* (2013.01)

(58) Field of Classification Search
CPC ... H04W 52/0251; H04W 4/02; H04W 52/02; H04W 52/028
USPC .......................... 455/574, 571, 572; 327/544
See application file for complete search history.

(56) References Cited

U.S. PATENT DOCUMENTS

| | | | |
|---|---|---|---|
| 4,709,404 A | 11/1987 | Tamura et al. | |
| 5,825,674 A * | 10/1998 | Jackson | G06F 1/206 712/E9.032 |
| 6,871,050 B2 | 3/2005 | Wahl | |
| 7,260,731 B1 * | 8/2007 | Read | G06F 1/26 713/300 |
| 7,519,430 B2 * | 4/2009 | Von Arx | A61N 1/37223 607/60 |
| 7,558,564 B2 * | 7/2009 | Wesby | G06Q 40/00 340/514 |
| 7,642,835 B1 * | 1/2010 | Fu | H01L 27/0222 327/534 |
| 7,702,937 B2 * | 4/2010 | Oh | G06F 1/3203 713/300 |
| 7,756,544 B1 * | 7/2010 | Graham | H04W 52/0258 370/310 |
| 7,788,516 B2 * | 8/2010 | Conroy | G06F 1/26 713/300 |
| 7,860,018 B2 * | 12/2010 | Raith | H04B 1/036 370/252 |
| 8,000,409 B2 * | 8/2011 | Chan | H04W 52/343 375/297 |

(Continued)

OTHER PUBLICATIONS

M. Lauridsen, P. Mogensen, and L. Noël; "Empirical LTE Smartphone Power Model with DRX Operation for System Level Simulations"; VTC Fall, IEEE 78th (Sep. 2013).

*Primary Examiner* — Hai V Nguyen
(74) *Attorney, Agent, or Firm* — Han IP Corporation; Andy M. Han (57) ABSTRACT

Techniques and examples pertaining to controlling power consumption of a mobile terminal are described. First information regarding at least one aspect of a mobile terminal, as sensed by the at least one sensor, may be received. Second information related to the first information may be transmitted to a remote terminal. Third information may be received from the remote terminal. The third information may be determined by the remote terminal based at least in part on the second information, information about data to be transmitted to or from the mobile terminal, one or more wireless communication variables, or a combination thereof. At least one operational parameter of a wireless transceiver of the mobile terminal may be controlled based on the third information.

20 Claims, 7 Drawing Sheets

(56) References Cited

U.S. PATENT DOCUMENTS

| | | | |
|---|---|---|---|
| 8,224,270 B2 | 7/2012 | Behzad | |
| 8,254,868 B2* | 8/2012 | Constien | G06F 1/3203 455/343.1 |
| 8,290,085 B2* | 10/2012 | Chan | H04W 52/343 375/297 |
| 8,306,772 B2* | 11/2012 | Cox | G01K 7/42 702/132 |
| 8,315,746 B2* | 11/2012 | Cox | G06F 1/203 320/144 |
| 8,362,949 B2* | 1/2013 | Yang | G01S 19/49 342/357.31 |
| 8,370,663 B2* | 2/2013 | Frid | G06F 1/3203 713/310 |
| 8,374,730 B2* | 2/2013 | Conroy | G06F 1/206 361/679.02 |
| 8,405,505 B2* | 3/2013 | Desai | H04W 52/0258 340/500 |
| 8,457,622 B2* | 6/2013 | Wesby | G06Q 40/00 340/514 |
| 8,514,754 B2* | 8/2013 | Wijayanathan | H04W 76/048 370/310 |
| 8,527,795 B2* | 9/2013 | Howard | G06F 1/30 713/320 |
| 8,594,650 B2* | 11/2013 | Tamura | H04W 52/0258 455/418 |
| 8,667,308 B2* | 3/2014 | de Cesare | G06F 1/3203 713/300 |
| 8,670,503 B2* | 3/2014 | Chan | H04W 52/343 375/297 |
| 8,676,149 B2* | 3/2014 | Beamish | H04W 52/028 455/343.1 |
| 8,718,719 B2* | 5/2014 | Guthrie | G06F 1/305 340/426.15 |
| 8,725,488 B2* | 5/2014 | Hofmann | G06F 1/3203 703/23 |
| 8,761,296 B2* | 6/2014 | Zhang | H04B 7/0404 375/267 |
| 8,798,763 B2* | 8/2014 | Forsell | A61N 1/08 607/33 |
| 8,847,669 B2* | 9/2014 | Park | G05D 23/1951 327/513 |
| 8,880,054 B2* | 11/2014 | Wesby | G06Q 40/00 340/514 |
| 9,043,627 B2* | 5/2015 | Culbert | G06F 1/20 713/300 |
| 9,118,701 B2* | 8/2015 | Wesby | G06Q 40/00 |
| 9,172,517 B2* | 10/2015 | Xhafa | H04L 5/0053 |
| 9,185,645 B2* | 11/2015 | Tamura | H04W 52/0225 |
| 9,256,265 B2* | 2/2016 | Huang | G06F 1/3203 |
| 9,317,090 B2* | 4/2016 | Culbert | G06F 1/26 |
| 9,350,405 B2* | 5/2016 | Zhu | H04B 1/0458 |
| 9,532,309 B2* | 12/2016 | Wu | H04W 52/0225 |
| 9,693,390 B2* | 6/2017 | Beninghaus | H04B 17/309 |
| 2005/0164633 A1* | 7/2005 | Linjama | H04B 1/1615 455/41.2 |
| 2005/0283208 A1* | 12/2005 | Von Arx | A61N 1/37223 607/60 |
| 2008/0108397 A1* | 5/2008 | Piipponen | G06F 1/3215 455/574 |
| 2009/0034443 A1* | 2/2009 | Walker | H04W 52/0274 370/311 |
| 2009/0109942 A1* | 4/2009 | Wijayanathan | H04W 76/048 370/338 |
| 2009/0163238 A1* | 6/2009 | Rao | H04W 52/225 455/522 |
| 2010/0056184 A1* | 3/2010 | Vakil | H04W 4/02 455/456.5 |
| 2010/0233989 A1* | 9/2010 | Constien | G06F 1/3203 455/343.1 |
| 2010/0291887 A1* | 11/2010 | Chan | H04W 52/343 455/127.1 |
| 2010/0302028 A1* | 12/2010 | Desai | H04W 52/0258 340/539.3 |
| 2011/0117973 A1* | 5/2011 | Asrani | H04W 52/245 455/571 |
| 2011/0153805 A1* | 6/2011 | Beninghaus | H04B 17/309 709/224 |
| 2011/0319124 A1* | 12/2011 | Chan | H04W 52/343 455/522 |
| 2012/0243686 A1* | 9/2012 | Wesby | G06Q 40/00 380/270 |
| 2012/0326922 A1* | 12/2012 | Yang | G01S 19/34 342/357.3 |
| 2012/0329411 A1* | 12/2012 | Chan | H04W 52/343 455/127.1 |
| 2013/0009472 A1* | 1/2013 | Orth | G05B 19/042 307/43 |
| 2013/0322562 A1* | 12/2013 | Zhang | H04B 7/0404 375/267 |
| 2014/0024321 A1* | 1/2014 | Zhu | H04B 1/0458 455/77 |
| 2014/0141845 A1* | 5/2014 | Li | H02J 7/0027 455/573 |
| 2014/0349593 A1* | 11/2014 | Danak | H04B 1/40 455/77 |
| 2014/0355502 A1* | 12/2014 | Xhafa | H04L 5/0053 370/311 |
| 2014/0358308 A1* | 12/2014 | Steckley | H02J 13/00 700/292 |
| 2015/0044996 A1* | 2/2015 | Wesby | G06Q 40/00 455/410 |
| 2016/0014690 A1* | 1/2016 | Xhafa | H04L 5/0053 370/311 |
| 2016/0109865 A1* | 4/2016 | Bojorges Rodríguez | G05B 15/02 700/275 |
| 2016/0226299 A1* | 8/2016 | Nam | H02J 7/042 |
| 2016/0241276 A1* | 8/2016 | Zhu | H04B 1/0458 |
| 2016/0249165 A1* | 8/2016 | Aldana | H04W 4/023 |
| 2016/0323934 A9* | 11/2016 | Beninghaus | H04B 17/309 |
| 2017/0269677 A1* | 9/2017 | Arriaga Fuentes | G06F 1/3287 |

* cited by examiner

METHOD, SYSTEM AND APPARATUS FOR CONTROLLING POWER CONSUMPTION OF A MOBILE TERMINAL

TECHNICAL FIELD

The present disclosure is generally related to wireless communication systems and, more specifically, to techniques, schemes and implementations of controlling power consumption of mobile communication terminals.

BACKGROUND

Unless otherwise indicated herein, approaches described in this section are not prior art to the claims listed below and are not admitted to be prior art by inclusion in this section.

Mobile communication terminals (herein interchangeably referred to as "mobile terminals") such as mobile phones, smartphones, personal data assistants, and the like are generally powered by an internal power supply, such as an internal battery or battery pack. The internal power supply typically has a predetermined capacity. The capacity of the internal power supply should provide a sufficient operating time for a given mobile terminal to operate under a variety of conditions, including handling comparatively greater power requirements encountered when transmitting and receiving wireless signals which carry broadband data. Prolonging the operating time of the mobile terminal generally improves user experience and increases the availability of the mobile terminal for public safety services.

In order to adhere to the requirements of prolonging the operating time of the mobile terminal having higher receive and transmit data rates by increasing the capacity of the internal power supply, the size and weight of the battery need to increase. However, this contradicts with the requirements of decreasing the overall size, weight and cost of the mobile terminal itself.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

In view of the aforementioned problem, there is a need for an improved method, system and apparatus of controlling power consumption of a mobile terminal to manage the power and/or energy consumption thereof, so as to prolong the operating time of the mobile terminal.

According to one example implementation, a method may involve a mobile terminal receiving first information from at least one sensor regarding at least one aspect of the mobile terminal sensed by the at least one sensor. The method may also involve the mobile terminal transmitting second information related to the first information to a remote terminal. The method may additionally involve the mobile terminal receiving third information from the remote terminal, with the third information determined by the remote terminal based at least in part on the second information, information about data to be transmitted to or from the mobile terminal, one or more wireless communication variables, or a combination thereof. The method may further involve the mobile terminal controlling at least one operational parameter of a wireless transceiver of the mobile terminal based on the third information.

According to another example implementation, a method may involve a fixed terminal wirelessly receiving respective second information from each of the plurality of mobile terminals, with the respective second information related to respective first information on at least one aspect of the respective mobile terminal sensed by corresponding at least one sensor. The method may also involve the fixed terminal selecting at least one operational parameter for the plurality of mobile terminals based on a combination of the second information received from the plurality of mobile terminals, information about data to be transmitted to or from the mobile terminal, and one or more wireless communication variables. The at last one operational parameter may be associated with a respective wireless transceiver of each of the plurality of mobile terminals and adjustable to control an amount of power consumption of the respective wireless transceiver. The method may further involve the fixed terminal wirelessly transmitting information about the at least one operational parameter as third information to the plurality of mobile terminals.

According to another example implementation, an apparatus may include a wireless transceiver, a power supply, at least one sensor and a processor. The wireless transceiver may include a transmitter section configured to wirelessly transmit data and a receiver section configured to wirelessly receive data. The power supply may be configured to store a charge of electricity and power the wireless transceiver. The at least one sensor may be coupled to sense at least one aspect of the apparatus. The processor may be coupled to the wireless transceiver and the at least one sensor. The processor may receive first information from the at least one sensor regarding the at least one aspect of the apparatus sensed by the at least one sensor. The processor may transmit, via the wireless transceiver, second information related to the first information. The processor may receive, via the wireless transceiver, third information related to the second information, information about data to be transmitted to or from the wireless transceiver, one or more wireless communication variables, or a combination thereof. The processor may also control at least one operational parameter of the wireless transceiver based on the third information.

Other features and advantages of the present disclosure will become apparent from the following description of various implementations which refer to the accompanying drawings.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION

Overview

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

The present disclosure may be described in terms of various functional components and various processing steps. It should be appreciated that such functional components may be realized by any number of hardware or structural components configured to perform the specified functions. For example, the present disclosure may employ various integrated components comprised of various electrical, mechanical and optical devices. In addition, the present disclosure may be practiced in any integrated application. Such general applications and other details that will be apparent to those skilled in the art in light of the present disclosure are not described in detail herein. Further, it should be noted that, while various components may be suitably coupled or connected to other components within exemplary devices, such connections and couplings may be realized by direct connection between components, or by connection through other components and devices located therebetween.

A conventional approach to controlling the power consumption of a mobile terminal typically includes setting the transmit power of a transmitter section of a wireless transceiver of the mobile terminal. However, in modern cellular systems such as Long Term Evolution (LTE), the energy consumption of a receiver section of the wireless transceiver is also high. For example, the mobile terminal may be a smartphone and a user may use the mobile terminal for video streaming that requires constant reception and processing of the broadband signals, thus consuming a high amount of energy.

In contrast, a primary feature provided by implementations in accordance with the present disclosure is the control of parameters of both the transmitter section and the receiver section of the wireless transceiver of the mobile terminal. Advantageously, such feature controls parameters of both the transmitter section and the receiver section to increase the continuous operating time of the mobile terminal based on a single battery charge, thereby increasing the availability of services, functions and convenience provided by the mobile terminal.

Another feature provided by implementations in accordance with the present disclosure is the use of different sensors together with a charge sensor and a transmit power sensor. The different sensors may include, for example and not limited to, a temperature sensor, a timer and a location sensor. The usage of the combination of these sensors enhances user experience by prolonging operating time based on a single battery charge. Information sensed by the sensors may include, for example and not limited to, battery charge level, battery temperature, time passed from the last charge of battery, transmit power and location of mobile terminal. The information sensed by the sensors may be utilized in controlling parameters of the wireless transceiver of the mobile terminal. Advantageously, increasing the operating time of the mobile terminal allows the user of the mobile terminal, while traveling in remote locations, to have increased availability of the mobile terminal for use in emergency situations. Moreover, as the capacity of a battery tends to degrade under prolong operation at high temperatures, sensing and taking into account the battery temperature in controlling parameters of the wireless transceiver of the mobile terminal advantageously help improve the capacity of the battery.

An additional feature provided by implementations in accordance with the present disclosure is the combining of the requests from multiple mobile terminals by a remote terminal, which may be a fixed terminal (e.g., a base station or eNodeB), while these mobile terminals operate in a radio access network operating in accordance with the LTE, UMTS or any other 3GPP standards. This allows the control of power consumption of the multiple mobile terminals to achieve joint optimization of power consumption for the availability of these mobile terminals in the network.

Example Systems

Figure 1:
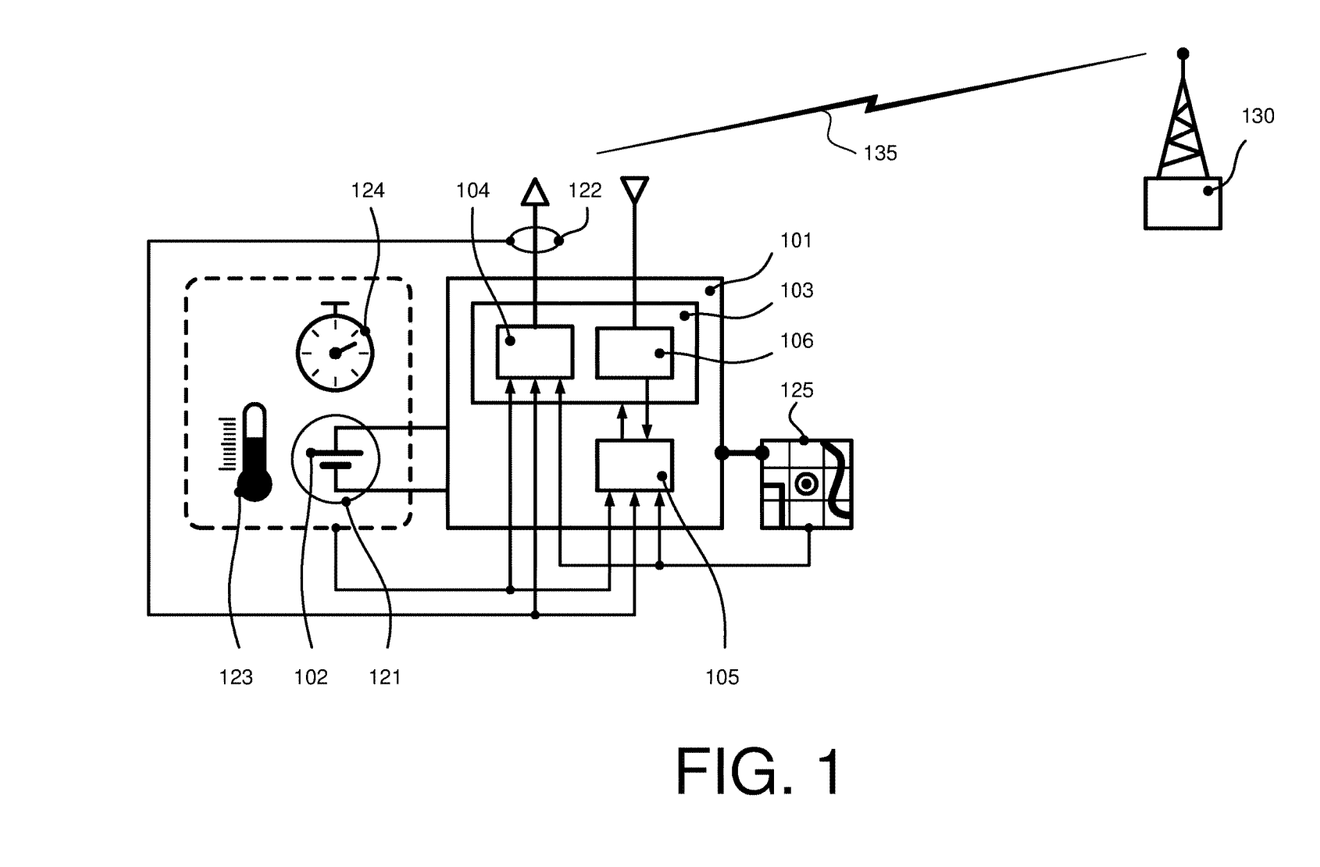
FIG. 1 is a simplified block diagram of an example system for controlling power consumption of a mobile terminal in accordance with at least some implementations of the present disclosure.

FIG. 1 depicts an example system 100 for controlling power consumption of a mobile terminal in accordance with at least some implementations of the present disclosure. System 100 may include a mobile terminal 101 and a remote terminal 130. Mobile terminal 101 may be a user equipment (UE) such as, for example and not limited to, a smartphone, a mobile phone, a personal digital assistant, or a portable or wearable device capable of mobile wireless communication. Remote terminal 130 may be a fixed terminal (e.g., a base state or eNodeB) or another mobile terminal. For illustrative purposes and without limitation, remote terminal 130 is shown as a fixed terminal in FIG. 1.

Mobile terminal 101 may include a power supply 102, a wireless transceiver 103 and a combiner 105. Power supply 102 may be a rechargeable battery configured to power mobile terminal 101. Additionally, wireless transceiver 103 may include a transmitter section 104 and a receiver section 106 configured to wirelessly transmit data and wirelessly receive data, respectively.

Mobile terminal 101 may also include a number of sensors. The sensors may include a charge sensor 121, a temperature sensor 123 and a timer 124, which may be operatively coupled to power supply 102 to measure or otherwise sense respective data of power supply 102. The sensors may also include a transmit power sensor 122 and a location sensor 125. Information sensed and outputted by the charge sensor 121, transmit power sensor 122, temperature sensor 123, timer 124 and location sensor 125 may be provided to transmitter section 104.

Transmitter section 104 of wireless transceiver 103 may be communicatively coupled to remote terminal 130 via a radio link 135 to wirelessly transmit data to remote terminal 130. Similarly, receiver section 106 of wireless transceiver 103 may be communicatively coupled to remote terminal 130 via radio link 135 to wirelessly receive data from remote terminal 130. An output of receiver section 106 may be coupled to combiner 105. Additionally, an output of each of charge sensor 121, transmit power sensor 122, temperature sensor 123, timer 124 and location sensor 125 may be coupled to combiner 105. Thus, combiner 105 may be coupled to receive data from receiver section 106 as well as sensed information provided by each of charge sensor 121, transmit power sensor 122, temperature sensor 123, timer 124 and location sensor 125. An output of combiner 105 may be coupled to a control input of wireless transceiver 103. Thus, wireless transceiver 103 may be coupled to receive data outputted by combiner 105.

Charge sensor 121 may be configured to measure or otherwise sense the charge level of power supply 102. Charge sensor 121 may be implemented as a device which measures the inner resistance of power supply 102 by measuring the voltage drop on the rails of power supply 102 when a load is connected to the rails of power supply 102. With a constant load, a lower charge level leads to a higher inner resistance and, thus, to a larger voltage drop, and vice versa. Wireless transceiver 103 may be the load. Temperature sensor 123 may be configured to measure or otherwise sense the temperature of power supply 102. Timer 124 may be configured to measure, count or otherwise determine the time lapsed or passed since the last charge of power supply 102. Transmit power sensor 122 may be configured to measure or otherwise sense the radio frequency (RF) power transmitted by transmit section 104 of wireless transceiver 103. The RF power may vary because of different impedance at the output of transmitter section 104 being part of mobile terminal 101. Transmit power sensor 122 may be operatively coupled to an output of the transmitter section 104 to measure or otherwise sense the transmit power of the transmitter section 104. Location sensor 125 may be coupled to, affixed to or otherwise mounted on mobile terminal 101. Location sensor 125 may be configured to sense or otherwise determine a geographic location (e.g., geographic coordinates) of itself (and hence mobile terminal 101) based on one or more available technologies such as, for example and not limited to, Global Positioning System (GPS), mobile phone tracking (e.g., network-based, mobile terminal-based and/or subscriber identity module (SIM)-based), or any combination thereof.

The information provided by charge sensor 121, transmit power sensor 122, temperature sensor 123, timer 124 and location sensor 125 may be transmitted by transmitter section 104 of wireless transceiver 103, as raw data, to remote terminal 130. Correspondingly, remote terminal 130 may combine the sensor-provided information received from mobile terminal 101 with information about data stream and contents of data to and from mobile terminal 101, and with wireless communication variables, information about other mobile terminals, and other information. The wireless communication variables may include bandwidth requirements for radio link 135 to and from mobile terminal 101, quality of radio link 135 to and from mobile terminal 101.

On the basis of this combination of information, one or more operational parameters associated with wireless transceiver 103 of mobile terminal 101 may be selected by remote terminal 130 to minimize or otherwise reduce consumption of energy from power supply 102 by wireless transceiver 103 while maintaining sufficient characteristics and quality of radio link 135. The one or more operational parameters may correspond to various aspects associated with wireless transceiver 103 such as, for example and not limited to, modulation types and channel bandwidths used in transmitter section 104 and receiver section 106, error correction coding used in transmitter section 104 and receiver section 106, transmit scheduling used in transmitter section 104 and receive scheduling used in receiver section 106, and transmit power in transmitter section 104.

Remote terminal 130 may transmit information on the one or more operational parameters associated with wireless transceiver 103 to mobile terminal 101. In some implementations, the information on the one or more operational parameters may include a respective range of values for each of the one or more operational parameters associated with wireless transceiver 103. In some implementations, the information on the one or more operational parameters may include a suggested value for each of the one or more operational parameters associated with wireless transceiver 103. Upon receiving such information, receiver section 106 of wireless transceiver 103 may provide the received information to combiner 105. Combiner 105 may process the information on the one or more operational parameters associated with wireless transceiver 103 with information from charge sensor 121, transmit power sensor 122, temperature sensor 123, timer 124 and location sensor 125. Combiner 105 may apply the one or more operational parameters to wireless transceiver 103. The one or more operational parameters may correspond to, for example and not limited to, modulation types and channel bandwidths used in transmitter section 104 and receiver section 106, error correction coding used in transmitter section 104 and receiver section 106, transmit and receive scheduling used in transmitter section 104 and receiver section 106, and transmit power in transmitter section 104.

For instance, in cases where remote terminal 130 provides a respective range of values for each of the one or more operational parameters associated with wireless transceiver 103, combiner 105 may, based on real-time information received from one or more of the sensors 121-125, select a value within the range for each of the one or more operational parameters. On the other hand, in cases where remote terminal 130 provides a suggested value for each of the one or more operational parameters associated with wireless transceiver 103, combiner 105 may, based on real-time information received from one or more of the sensors 121-125, apply the suggested value or a different value for each of the one or more operational parameters. Thus, remote terminal 130 may suggest a fixed value or a range of values for each of the one or more operational parameters associated with wireless transceiver 103 for the purpose of controlling power consumption of mobile terminal 101 while maintaining sufficient characteristics and quality of radio link 135. In applying the suggested value or range of values for each of the one or more operational parameters associated with wireless transceiver 103, mobile terminal 101 may apply the suggested value(s) or modified value(s) depending on real-time condition of one or more aspects of mobile terminal 101.

Figure 2:
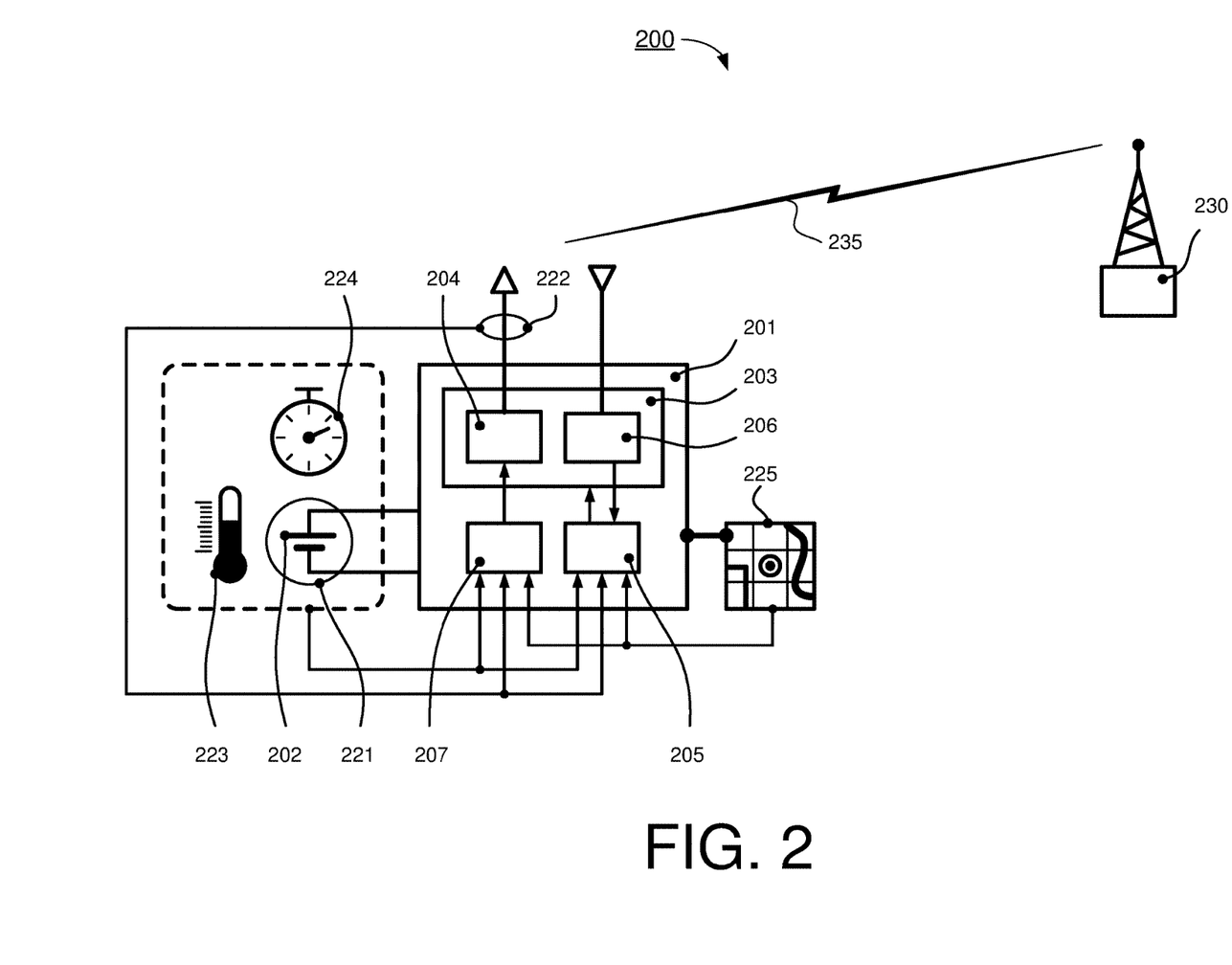
FIG. 2 is a simplified block diagram of an example system for controlling power consumption of a mobile terminal in accordance with at least some implementations of the present disclosure.

FIG. 2 depicts an example system 200 for controlling power consumption of a mobile terminal in accordance with at least some implementations of the present disclosure. System 200 may include a mobile terminal 201 and a remote terminal 230. Mobile terminal 201 may be a UE such as, for example and not limited to, a smartphone, a mobile phone, a personal digital assistant, or a portable or wearable device capable of mobile wireless communication. Remote terminal 230 may be a fixed terminal (e.g., a base state or eNodeB) or another mobile terminal. For illustrative purposes and without limitation, remote terminal 230 is shown as a fixed terminal in FIG. 2.

Mobile terminal 201 may include a power supply 202, a wireless transceiver 203, a combiner 205 and a computational block 207. Power supply 202 may be a rechargeable battery configured to power mobile terminal 201. Additionally, wireless transceiver 203 may include a transmitter section 204 and a receiver section 206 configured to wirelessly transmit data and wirelessly receive data, respectively.

Mobile terminal 201 may also include a number of sensors. The sensors may include a charge sensor 221, a temperature sensor 223 and a timer 224, which may be operatively coupled to power supply 202 to measure or otherwise sense respective data of power supply 202. The sensors may also include a transmit power sensor 222 and a location sensor 225. Information sensed and outputted by the charge sensor 221, transmit power sensor 222, temperature sensor 223, timer 224 and location sensor 225 may be provided to transmitter section 204.

Each of charge sensor 221, transmit power sensor 222, temperature sensor 223, timer 224 and location sensor 225 may be identical or similar to charge sensor 121, transmit power sensor 122, temperature sensor 123, timer 124 and location sensor 125. That is, configuration, capability and functionality of each of charge sensor 121, transmit power sensor 122, temperature sensor 123, timer 124 and location sensor 125 as described above is applicable to each of charge sensor 221, transmit power sensor 222, temperature sensor 223, timer 224 and location sensor 225, respectively. Thus, in the interest of brevity, detailed description of charge sensor 221, transmit power sensor 222, temperature sensor 223, timer 224 and location sensor 225 is not provided herein so as to avoid redundancy.

Transmitter section 204 of wireless transceiver 203 may be communicatively coupled to remote terminal 230 via a radio link 235 to wirelessly transmit data to remote terminal 230. Similarly, receiver section 206 of wireless transceiver 203 may be communicatively coupled to remote terminal 230 via radio link 235 to wirelessly receive data from remote terminal 230. An output of receiver section 206 may be coupled to combiner 205. Additionally, an output of each of charge sensor 221, transmit power sensor 222, temperature sensor 223, timer 224 and location sensor 225 may be coupled to combiner 205. Thus, combiner 205 may be coupled to receive data from receiver section 206 as well as sensed information provided by each of charge sensor 221, transmit power sensor 222, temperature sensor 223, timer 224 and location sensor 225. An output of combiner 205 may be coupled to a control input of wireless transceiver 203. Thus, wireless transceiver 203 may be coupled to receive data outputted by combiner 205. The Additionally, the output of each of charge sensor 221, transmit power sensor 222, temperature sensor 223, timer 224 and location sensor 225 may be coupled to computational block 207, and the output of computational block 207 may be coupled to transmitter section 204 of wireless transceiver 203. The sensed information provided by each of charge sensor 221, transmit power sensor 222, temperature sensor 223, timer 224 and location sensor 225 may be processed by computational block 207. On the basis of the sensed information from sensors 221-225, computational block 207 may determine or otherwise identify a number of operational parameters associated wireless transceiver 203 that can be controlled or otherwise adjusted to minimize consumption of energy from power supply 202. In some implementations, computational block 207 may query a database (not shown), which may be stored locally in mobile terminal 201 or remotely. That is, such number of operational parameters may be determined or otherwise identified based on the sensed information received from sensors 221-225.

Information on the identified operational parameters may be transmitted to remote terminal 230 by transmitter section 204 of wireless transceiver 203. Correspondingly, remote terminal 230 may combine the identified operational parameters associated with wireless transceiver 203 received from mobile terminal 201 with information about data stream and contents of data to and from mobile terminal 201, and with wireless communication variables, information about other mobile terminals, and other information. The wireless communication variables may include bandwidth requirements for radio link 235 to and from mobile terminal 201, quality of radio link 235 to and from mobile terminal 201.

On the basis of this combination of information, one or more operational parameters associated with wireless transceiver 203 of mobile terminal 201 may be selected by remote terminal 230 to minimize or otherwise reduce consumption of energy from power supply 202 by wireless transceiver 203 while maintaining sufficient characteristics and quality of radio link 235. The one or more operational parameters may correspond to various aspects associated with wireless transceiver 203 such as, for example and not limited to, modulation types and channel bandwidths used in transmitter section 204 and receiver section 206, error correction coding used in transmitter section 204 and receiver section 206, transmit scheduling used in transmitter section 204 and receive scheduling used in receiver section 206, and transmit power in transmitter section 204.

Remote terminal 230 may transmit information on the one or more operational parameters associated with wireless transceiver 203 to mobile terminal 201. In some implementations, the information on the one or more operational parameters may include a respective range of values for each of the one or more operational parameters associated with wireless transceiver 203. In some implementations, the information on the one or more operational parameters may include a suggested value for each of the one or more operational parameters associated with wireless transceiver 203. Upon receiving such information, receiver section 205 of wireless transceiver 203 may provide the received information to combiner 205. Combiner 205 may process the information on the one or more operational parameters associated with wireless transceiver 203 with information from charge sensor 221, transmit power sensor 222, temperature sensor 223, timer 224 and location sensor 225. Combiner 205 may apply the one or more operational parameters to wireless transceiver 203. The one or more operational parameters may correspond to, for example and not limited to, modulation types and channel bandwidths used in transmitter section 204 and receiver section 206, error correction coding used in transmitter section 204 and receiver section 206, transmit and receive scheduling used in transmitter section 204 and receiver section 206, and transmit power in transmitter section 204.

For instance, in cases where remote terminal 230 provides a respective range of values for each of the one or more operational parameters associated with wireless transceiver 203, combiner 205 may, based on real-time information received from one or more of the sensors 221-225, select a value within the range for each of the one or more operational parameters. On the other hand, in cases where remote terminal 230 provides a suggested value for each of the one or more operational parameters associated with wireless transceiver 203, combiner 205 may, based on real-time information received from one or more of the sensors 221-225, apply the suggested value or a different value for each of the one or more operational parameters. Thus, remote terminal 230 may suggest a fixed value or a range of values for each of the one or more operational parameters associated with wireless transceiver 203 for the purpose of controlling power consumption of mobile terminal 201 while maintaining sufficient characteristics and quality of radio link 235. In applying the suggested value or range of values for each of the one or more operational parameters associated with wireless transceiver 203, mobile terminal 201 may apply the suggested value(s) or modified value(s) depending on real-time condition of one or more aspects of mobile terminal 201.

Figure 3:
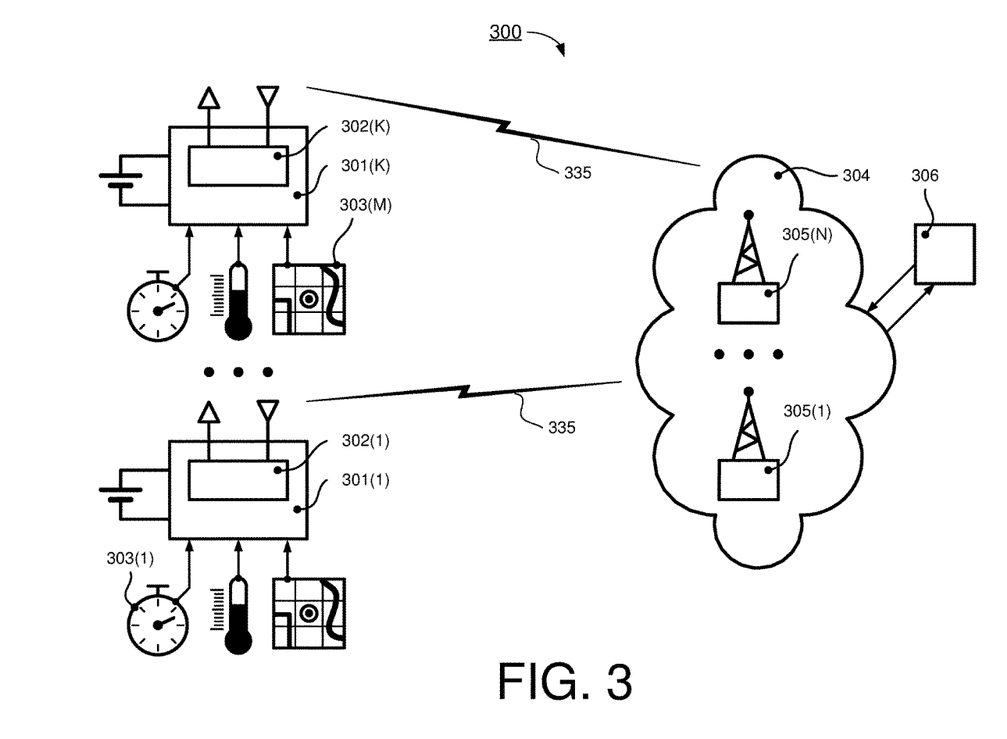
FIG. 3 is a simplified block diagram of an example system for controlling power consumption of a number of mobile terminals in a radio access network in accordance with at least some implementations of the present disclosure.

FIG. 3 depicts an example system 300 for controlling power consumption of a number of mobile terminals in a radio access network in accordance with at least some implementations of the present disclosure. Referring to FIG. 3, system 300 may include a number of mobile terminals 301(1)-301(K) equipped with wireless transceivers 302(1)-302(K), where K is a positive integer greater than 1. Each of at least two or more of mobile terminals 301(1)-301(K) may be equipped with respective sensors 303(1)-303(M) in a way similar to mobile terminal 101 and mobile terminal 201 described above. That is, sensors 303(1)-303(M) of each of the at least two or more of mobile terminals 301(1)-301(K) may include a charge sensor, a transmit power sensor, a temperature sensor, a timer and a location sensor.

Mobile terminals 301(1)-301(K) may be communicatively coupled to a radio access network 304 via shared common radio resources. Radio access network 304 may include a number of remote terminals 305(1)-305(N), where N is a positive integer greater than or equal to 1. Radio access network 304 may be controlled by a network controller 306, and network controller 306 may receive data from radio access network 304 for further processing and for network management purposes. In some implementations, radio access network 304 may operate in compliance with the LTE, UMTS and/or other 3GPP standards.

Mobile terminals 301(1)-301(K) may share common radio resources in transmitting data to radio access network 304 and in receiving data from radio access network 304. The common radio resources may include, for example and not limited to, frequency channels within frequency bands and time intervals for access to these bands and channels.

Each of those of mobile terminals 301(1)-301(K) equipped with sensors 303(1)-303(M) may collect sensed information from the respective sensors 303(1)-303(M), and may generate and transmit a request to radio access network 304. In some implementations, the request from each of those of mobile terminals 301(1)-301(K) equipped with sensors 303(1)-303(M) may include the sensed information from the respective sensors 303(1)-303(M) as raw data, as described above with respect to system 100. In some implementations, the request from each of those of mobile terminals 301(1)-301(K) equipped with sensors 303(1)-303(M) may include information on a number of identified operational parameters, as described above with respect to system 200.

Network controller 306 may combine the requests from two or more of mobile terminals 301(1)-301(K) with information about data stream and contents of data to and from mobile terminals 301(1)-301(K), wireless communication variables, information about other mobile terminals, and other information. The wireless communication variables may include bandwidth requirements for a radio link 335 to and from mobile terminals 301(1)-301(K), quality of radio link 335 to and from mobile terminals 301(1)-301(K). On the basis of this combination of information, network controller 306 may select one or more operational parameters associated with wireless transceivers 302(1)-302(K) of mobile terminals 301(1)-301(K) for the minimization or reduction of power consumption of mobile terminals 301 (1)-301(K) while maintaining sufficient characteristics and quality of radio link 335 for each of mobile terminals 301(1)-301(K). Radio access network 304 may transmit information on the one or more operational parameters to mobile terminals 301(1)-301(K). Correspondingly, mobile terminals 301(1)-301(K) may apply the one or more operational parameters to wireless transceivers 302(1)-302(K). The one or more operational parameters may correspond to, for example and not limited to, modulation types and channel bandwidths used in the transmitter section and the receiver section of wireless transceivers 302(1)-302(K), error correction coding used in the transmitter section and the receiver section of wireless transceivers 302(1)-302(K), transmit and receive scheduling used in the transmitter section and the receiver section of wireless transceivers 302(1)-302(K), and transmit power in the transmitter section of wireless transceivers 302(1)-302(K).

For instance, in cases where network controller 306 provides a respective range of values for each of the one or more operational parameters associated with wireless transceivers 302(1)-302(K), mobile terminals 301(1)-301(K) may, based on real-time information received from one or more of the sensors 303(1)-303(M), select a value within the range for each of the one or more operational parameters. On the other hand, in cases where network controller 306 provides a suggested value for each of the one or more operational parameters associated with wireless transceivers 302(1)-302(K), mobile terminals 301(1)-301(K) may, based on real-time information received from one or more of the sensors 303(1)-303(M), apply the suggested value or a different value for each of the one or more operational parameters. Thus, network controller 306 may suggest a fixed value or a range of values for each of the one or more operational parameters associated with wireless transceivers 302(1)-302(K) for the purpose of controlling power consumption of mobile terminals 301(1)-301(K) while maintaining sufficient characteristics and quality of radio link 335. In applying the suggested value or range of values for each of the one or more operational parameters associated with wireless transceivers 302(1)-302(K), mobile terminals 301(1)-301(K) may apply the suggested value(s) or modified value(s) depending on real-time condition of one or more aspects of mobile terminals 301(1)-301(K).

Figure 4:
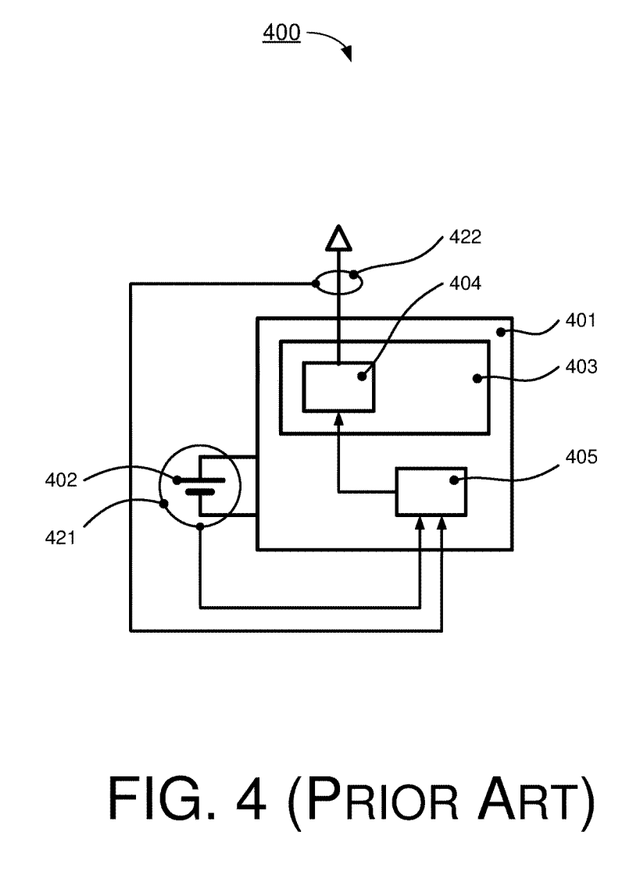
FIG. 4 is a block diagram of a prior art system for controlling power consumption of a mobile terminal.

For comparison and to aid better appreciation of the differences between the prior art and various implementations in accordance with the present disclosure, a prior art system 400 is illustrated in FIG. 4.

Referring to FIG. 4, prior art system 400 includes a mobile terminal 401 powered by a power supply 402, which may be a rechargeable battery. A charge sensor 421 is coupled with power supply 402. Mobile terminal 401 includes a wireless transceiver 403, which includes a transmitter section 404. A transmit power sensor 422 is coupled to the output of the transmitter section 404. Outputs of charge sensor 421 and transmit power sensor 422 are connected to a combiner 405. The output of combiner 405 is connected to a control input of transmitter section 404. Charge sensor 421 measures the inner resistance of power supply 402 by measuring the voltage drop on the rails of power supply 402 when a load, such as transmitter section 404, is connected to the rails of power supply 402. Transmit power sensor 422 measures the RF power transmitted by transmitter section 404.

In prior art system 400, control of power consumption of mobile terminal 401 typically involves combining, by combiner 405, sensed information from charge sensor 421 and transmit power sensor 422, and setting the transmit power of transmitter section 404 based on a result of the combining. However, this approach does not take into account the power consumed by a receiver section of wireless transceiver 403 (not shown) or other factors such as temperature of power supply 402, time passed since the last time power supply 402 was charged, and location of mobile terminal 401.

Example Apparatus

Figure 5:
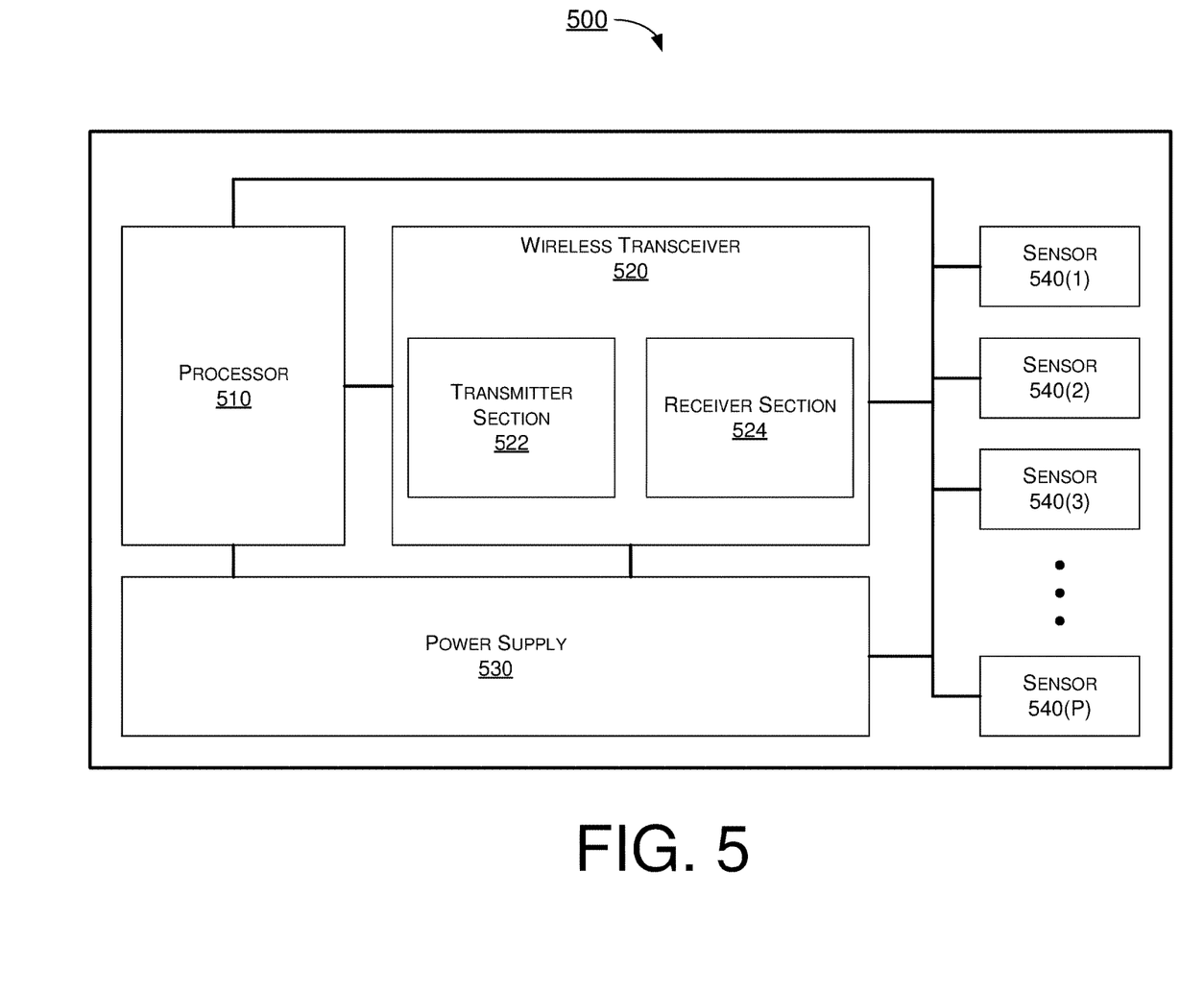
FIG. 5 is a simplified block diagram of an example apparatus in accordance with at least some implementations of the present disclosure.

FIG. 5 depicts an example apparatus 500 in accordance with an implementation of the present disclosure. Apparatus 500 may perform, execute or otherwise carry out various functions, tasks and/or operations related to concepts, techniques, schemes, solutions, scenarios, processes and methods described herein, including those with respect to systems 100, 200 and 300 described above as well as processes 600 and 700 described below. Apparatus 500 may be an example implementation of mobile terminal 101, mobile terminal 201 and/or any of mobile terminals 301(1)-301(K). Apparatus 500 may include one, some or all of the components shown in FIG. 5. Apparatus 500 may optionally include additional component(s) not shown in FIG. 5. Such additional components are not relevant to the present disclosure, albeit necessary for the operation of apparatus 500, and thus are not shown in FIG. 5 so as to avoid obscuring the illustration.

Apparatus 500 may be an electronic apparatus which may be, for example and not limited to, a portable device (e.g., smartphone, personal digital assistant, digital camera and the like), a computing device (e.g., laptop computer, notebook computer, desktop computer, tablet computer and the like) or a wearable device (e.g., smartwatch, smart bracelet, smart necklace and the like). Alternatively, apparatus 500 may be implemented in the form of one or more integrated-circuit (IC) chips such as, for example and not limited to, one or more single-core processors, one or more multi-core processors, or one or more complex-instruction-set-computing (CISC) processors.

Apparatus 500 may include at least a processor 510, which is a special-purpose device designed and configured to perform, execute or otherwise carry out specialized algorithms, software instructions, computations and logics to control power consumption in accordance with the present disclosure. That is, processor 510 may include specialized hardware (and, optionally, specialized firmware) specifically designed and configured to control power consumption in one or more novel ways not previously existing or available.

In some implementations, apparatus 500 may also include a wireless transceiver 520 coupled to processor 510. Wireless transceiver 520 may include a transmitter section 522 configured to wirelessly transmit data as well as a receiver section 524 configured to wirelessly receive data. In some implementations, apparatus 500 may also include a power supply 530 configured to store a charge of electricity to power the wireless transceiver 520.

In some implementations, apparatus 500 may further include at least one sensor 540(1)-540(P), where P is a positive integer greater than or equal to 1. The at least one sensor 540(1)-540(P) may be coupled to respective component(s) of apparatus 500 (e.g., wireless transceiver 520 and/or power supply 530) to sense at least one aspect of apparatus 500. The at least one sensor 540(1)-540(P) may be also coupled to processor 510 to provide sensed/measured information or data to processor 510. In some implementations, the at least one sensor 540(1)-540(P) may include one or more sensors of multiple of sensors. Such multiple sensors may include at least the following: (1) a charge sensor configured to sense a charge level of power supply 530; (2) a temperature sensor configured to sense a temperature of power supply 530; (3) a timer configured to measure an amount of passage of time since power supply 530 was previously charged by an external power supply (e.g., AC power mains); (4) a transmit power sensor configured to measure an amount of RF power emitted by transmitter section 522 of wireless transceiver 520; and (5) a location sensor configured to determine a geographic location of the apparatus.

The charge sensor may be configured to measure or otherwise sense the charge level of power supply 530. The charge sensor may be implemented as a device which measures the inner resistance of power supply 530 by measuring the voltage drop on the rails of power supply 530 when a load (e.g., wireless transceiver 520) is connected to the rails of power supply 530. With a constant load, a lower charge level leads to a higher inner resistance and, thus, to a larger voltage drop, and vice versa. The temperature sensor may be configured to measure or otherwise sense the temperature of power supply 530. The timer may be configured to measure, count or otherwise determine the time lapsed or passed since the last charge of power supply 530. The transmit power sensor may be configured to measure or otherwise sense the RF power emitted by transmit section 522 of wireless transceiver 520. The RF power may vary because of different impedance at the output of transmitter section 522 being part of apparatus 500. The location sensor may be coupled to, affixed to or otherwise mounted on apparatus 500. The location sensor may be configured to sense or otherwise determine a geographic location (e.g., geographic coordinates) of itself (and hence apparatus 500) based on one or more available technologies such as, for example and not limited to, GPS, mobile phone tracking (e.g., network-based, mobile terminal-based and/or SIM-based), or any combination thereof.

Processor 510 may receive first information from the at least one sensor 540(1)-540(P) regarding the at least one aspect of apparatus 510, sensed by the at least one sensor 540(1)-540(P). Processor 510 may transmit, via wireless transceiver 520, second information related to the first information. Processor 510 may also receive, via wireless transceiver 520, third information. The third information may be related to the second information, information about data to be transmitted to or from wireless transceiver 520, one or more wireless communication variables, or a combination thereof. That is, the third information may be related to some or all of the second information, information about data to be transmitted to or from wireless transceiver 520, and one or more wireless communication variables. Processor 510 may control at least one operational parameter of wireless transceiver 520 based on the third information.

In some implementations, in transmitting the second information to the remote terminal, processor 510 may be configured to identify, based on the first information, a number of operational parameters associated with either or both of transmitter section 522 and receiver section 524 of wireless transceiver 520, including the at least one operational parameter. These operational parameters may be adjustable to control an amount of power consumption of wireless transceiver 520. Moreover, processor 510 may be configured to transmit, via wireless transceiver 520, information regarding these operational parameters as the second information.

In some implementations, in controlling the at least one operational parameter of wireless transceiver 520, processor 510 may be configured to control either or both of transmitter section 522 and receiver section 524 of wireless transceiver 520 in terms of one or more of bandwidth, modulation, error correction coding, transmit power, and scheduling. That is, processor 510 may control, adjust or otherwise set value(s) for transmitter section 522 regarding the bandwidth, modulation, error correction coding, transmit power and/or scheduling with respect to transmitter section 522. Alternatively or additionally, processor 510 may control, adjust or otherwise set value(s) for receiver section 524 regarding the bandwidth, modulation, error correction coding and/or scheduling with respect to receiver section 524. By doing so, processor 510 may minimize the consumption of power of power supply 530 by wireless transceiver 520 while maintaining sufficient characteristics of the radio link.

In some implementations, the third information may include a respective range of values for each of the at least one operational parameter of wireless transceiver 520. In some implementations, the information about the data to be transmitted to or from wireless transceiver 520 may include information about one or more data streams and contents of the one or more data streams transmitted to and from wireless transceiver 520. In some implementations, the one or more wireless communication variables may include one or more bandwidth requirements, a quality of a radio link for wireless transmission to and from wireless transceiver 520, or a combination thereof.

Example Processes

Figure 6:
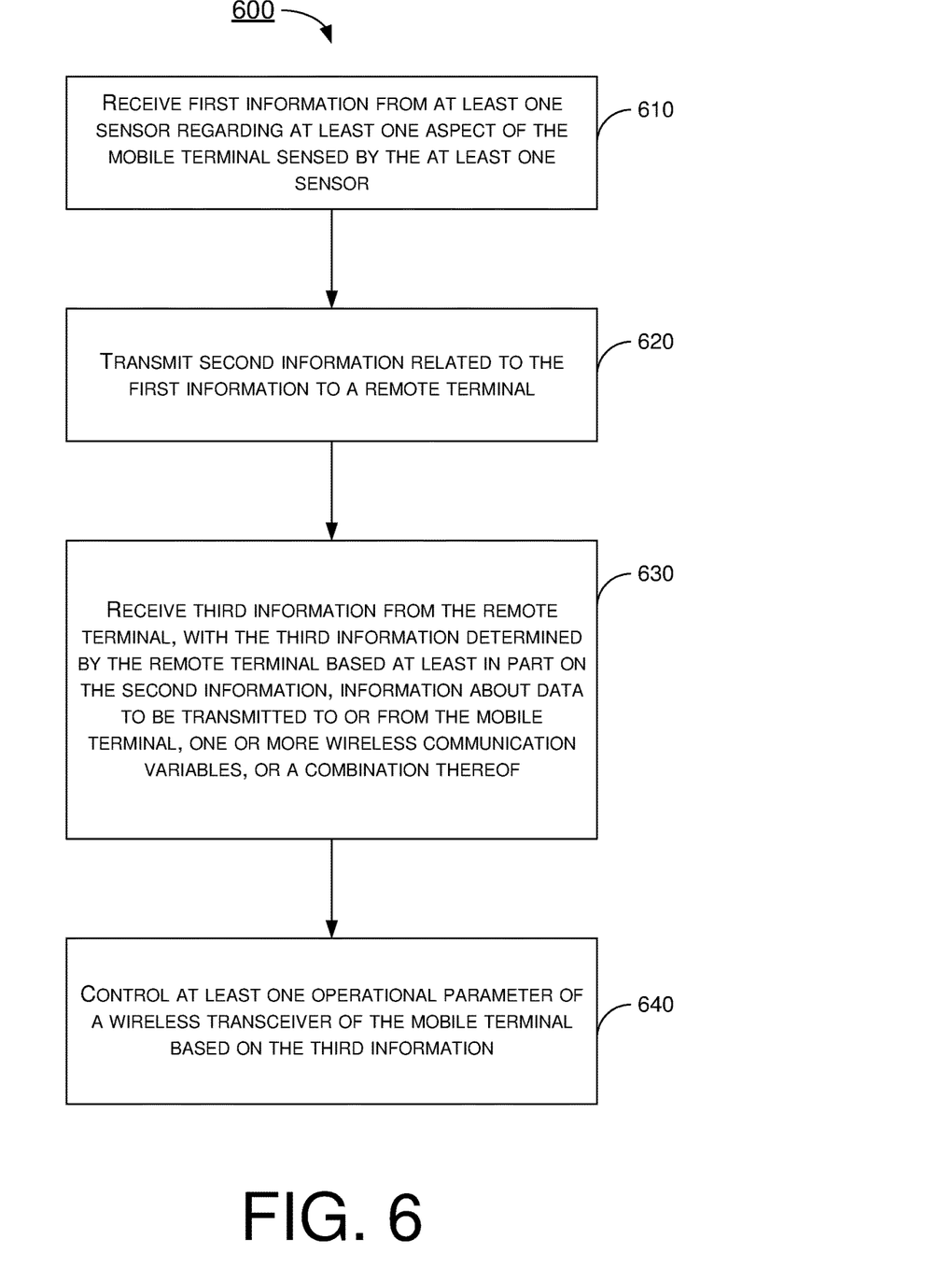
FIG. 6 is a flowchart of an example process in accordance with at least some implementations of the present disclosure.

FIG. 6 depicts an example process 600 pertaining to image frame synchronization for dynamic frame rate in dual-camera applications in accordance with an implementation of the present disclosure. Process 600 may include one or more operations, actions, or functions as represented by one or more of blocks 610, 620, 630 and 640. Although illustrated as discrete blocks, various blocks of process 600 may be divided into additional blocks, combined into fewer blocks, or eliminated, depending on the desired implementation. The blocks and sub-blocks of process 600 may be performed in the order shown in FIG. 6 or in any other order, depending on the desired implementation. Process 600 may be implemented by mobile terminal 101, mobile terminal 201, any of mobile terminals 301(1)-301(K) and apparatus 500, as well as any variations and/or derivatives thereof. Process 600 may be implemented in systems 100, 200 and 300. Solely for illustrative purposes and without limitation, process 600 is described below in the context of controlling the power consumption of mobile terminal 201. Process 600 may begin at block 610.

At 610, process 600 may involve mobile terminal 201 receiving first information from at least one sensor (e.g., sensors 221-225) regarding at least one aspect of mobile terminal 201 sensed by the at least one sensor. Process 600 may proceed from 610 to 620.

At 620, process 600 may involve mobile terminal 201 transmitting second information related to the first information to remote terminal 230. Process 600 may proceed from 620 to 630.

At 630, process 600 may involve mobile terminal 201 receiving third information from remote terminal 230. The third information may be determined by remote terminal 230 based at least in part on the second information, information about data to be transmitted to or from mobile terminal 201, one or more wireless communication variables, or a combination thereof. In some implementations, the information about the data to be transmitted to or from mobile terminal 201 may include information about one or more data streams and contents of the one or more data streams transmitted to and from mobile terminal 201. In some implementations, the one or more wireless communication variables may include one or more bandwidth requirements, a quality of a radio link for wireless transmission to and from mobile terminal 201, or a combination thereof. Process 600 may proceed from 630 to 640.

At 640, process 600 may involve mobile terminal 201 controlling at least one operational parameter of wireless transceiver 203 of mobile terminal 201 based on the third information.

In some implementations, in receiving the first information from the at least one sensor regarding the at least one aspect of mobile terminal 201 sensed by the at least one sensor, process 600 may involve mobile terminal 201 receiving the first information from one or more sensors of a plurality of sensors. The plurality of sensors may include: (1) a charge sensor configured to sense a charge level of power supply 202 associated with mobile terminal 201; (2) a temperature sensor configured to sense a temperature of power supply 202; (3) a timer configured to measure an amount of passage of time since power supply 202 was previously charged by an external power supply; (4) a transmit power sensor configured to measure an amount of RF power emitted by transmitter section 204 of wireless transceiver 203 of mobile terminal 201; and (5) a location sensor configured to determine a geographic location of mobile terminal 201.

In some implementations, in transmitting the second information to remote terminal 230, process 600 may involve mobile terminal 201 identifying, based on the first information, a plurality of operational parameters of wireless transceiver 203, including the at least one operational parameter, that are adjustable to control an amount of power consumption of wireless transceiver 203. Moreover, process 600 may involve mobile terminal 201 transmitting, to remote terminal 230, information regarding the plurality of operational parameters as the second information. In some implementations, in identifying the plurality of operational parameters of wireless transceiver 203, process 600 may involve mobile terminal 201 identifying the plurality of operational parameters associated with transmitter section 204 of wireless transceiver 203. Alternatively or additionally, in identifying the plurality of operational parameters of wireless transceiver 203, process 600 may involve mobile terminal 201 identifying the plurality of operational parameters associated with receiver section 206 of wireless transceiver 203.

In some implementations, the third information may include a respective range of values for each of the at least one operational parameter of wireless transceiver 203.

In some implementations, in controlling the at least one operational parameter of wireless transceiver 203 of mobile terminal 201, process 600 may involve mobile terminal 201 controlling transmitter section 204 of wireless transceiver 203 in terms of bandwidth, modulation, error correction coding, transmit power, scheduling, or a combination thereof. Alternatively or additionally, in controlling the at least one operational parameter of wireless transceiver 203 of mobile terminal 201, process 600 may involve mobile terminal 201 controlling receiver section 206 of wireless transceiver 203 in terms of bandwidth, modulation, error correction coding, scheduling, or a combination thereof.

Figure 7:
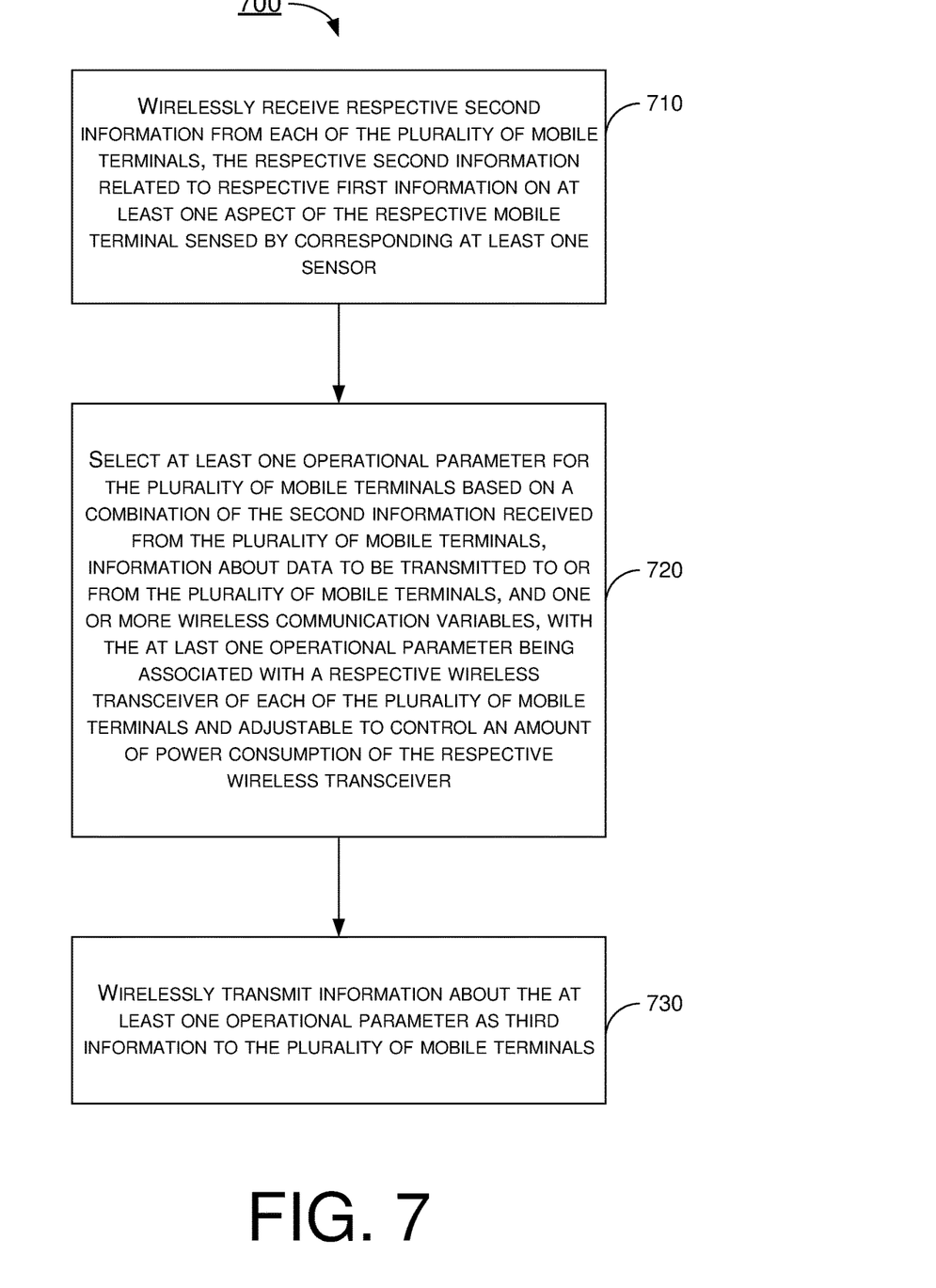
FIG. 7 is a flowchart of an example process in accordance with at least some implementations of the present disclosure.

FIG. 7 depicts an example process 700 pertaining to image frame synchronization for dynamic frame rate in dual-camera applications in accordance with an implementation of the present disclosure. Process 700 may include one or more operations, actions, or functions as represented by one or more of blocks 710, 720 and 730. Although illustrated as discrete blocks, various blocks of process 700 may be divided into additional blocks, combined into fewer blocks, or eliminated, depending on the desired implementation. The blocks and sub-blocks of process 700 may be performed in the order shown in FIG. 7 or in any other order, depending on the desired implementation. Process 700 may be implemented by remote terminal 130, remote terminal 230, any of remote terminals 305(1)-305(N) and network controller 306, as well as any variations and/or derivatives thereof. Process 700 may be implemented in systems 100, 200 and 300. Solely for illustrative purposes and without limitation, process 700 is described below in the context of controlling power consumption of mobile terminals 301(1)-301(K). Process 700 may begin at block 710.

At 710, process 700 may involve remote terminal 305(1) wirelessly receiving respective second information from each of the plurality of mobile terminals 301(1)-301(K). The respective second information may be related to respective first information on at least one aspect of the respective mobile terminal 301(1)-301(K) sensed by corresponding at least one sensor. Process 700 may proceed from 710 to 720.

At 720, process 700 may involve remote terminal 305(1) selecting at least one operational parameter for the plurality of mobile terminals 301(1)-301(K) based on a combination of the second information received from the plurality of mobile terminals 301(1)-301(K), information about data to be transmitted to or from the plurality of mobile terminals 301(1)-301(K), and one or more wireless communication variables. The at last one operational parameter may be associated with a respective wireless transceiver 302(1)-302(K) of each of the plurality of mobile terminals 301(1)-301(K), and may be adjustable to control an amount of power consumption of the respective wireless transceiver 302(1)-302(K). Process 700 may proceed from 720 to 730.

At 730, process 700 may involve remote terminal 305(1) wirelessly transmitting information about the at least one operational parameter as third information to the plurality of mobile terminals 301(1)-301(K).

In some implementations, the at least one sensor corresponding to each of the plurality of mobile terminals 301(1)-301(K) may include one or more sensors of a plurality of sensors. The plurality of sensors may include: (1) a charge sensor configured to sense a charge level of a power supply associated with the respective mobile terminal 301(1)-301(K); (2) a temperature sensor configured to sense a temperature of the power supply; (3) a timer configured to measure an amount of passage of time since the power supply was previously charged by an external power supply; (4) a transmit power sensor configured to measure an amount of RF power emitted by a transmitter section of the respective wireless transceiver 302(1)-302(K) of the respective mobile terminal 301(1)-301(K); and (5) a location sensor configured to determine a geographic location of the respective mobile terminal 301(1)-301(K).

In some implementations, the third information may include a respective range of values for each of the at least one operational parameter associated with the respective wireless transceiver 302(1)-302(K) of each of the plurality of mobile terminals 301(1)-301(K).

In some implementations, the at least one operational parameter may include one or more operational parameters associated with a transmitter section of the respective wireless transceiver 302(1)-302(K) of each of the plurality of mobile terminals 301(1)-301(K) in terms of bandwidth, modulation, error correction coding, transmit power, scheduling, or a combination thereof. Alternatively or additionally, the at least one operational parameter may include one or more operational parameters associated with a receiver section of the respective wireless transceiver 302(1)-302(K) of each of the plurality of mobile terminals 301(1)-301(K) in terms of bandwidth, modulation, error correction coding, scheduling, or a combination thereof.

Additional Notes

The herein-described subject matter sometimes illustrates different components contained within, or connected with, different other components. It is to be understood that, while some advantages have been discussed with various implementations, these advantages may not be included in all embodiments and/or implementations in accordance with the present disclosure. It is also to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method of controlling power consumption of a mobile terminal, comprising:
    receiving first information from at least one sensor regarding two or more aspects of a plurality of aspects of the mobile terminal sensed by the at least one sensor, the plurality of aspects comprising a charge level of a power supply of the mobile terminal, a temperature of the power supply, and an amount of passage of time since the power supply was previously charged by an external power supply;
    transmitting second information related to the first information to a remote terminal;
    receiving third information from the remote terminal, the third information determined by the remote terminal based at least in part on the second information, information about data to be transmitted to or from the mobile terminal, one or more wireless communication variables, or a combination thereof; and
    controlling at least one operational parameter of a wireless transceiver of the mobile terminal based on the third information.

2. The method of claim 1, wherein the receiving of the first information from the at least one sensor regarding the two or more aspects of a plurality of aspects of the mobile terminal sensed by the at least one sensor comprises receiving the first information from one or more sensors of a plurality of sensors, the plurality of sensors comprising:
    a charge sensor configured to sense the charge level of the power supply of the mobile terminal;
    a temperature sensor configured to sense the temperature of the power supply;
    a timer configured to measure the amount of passage of time since the power supply was previously charged by the external power supply;
    a transmit power sensor configured to measure an amount of radio frequency (RF) power emitted by a transmitter section of the wireless transceiver of the mobile terminal; and
    a location sensor configured to determine a geographic location of the mobile terminal.

3. The method of claim 1, wherein the transmitting of the second information to the remote terminal comprises:
    identifying, based on the first information, a plurality of operational parameters of the wireless transceiver, including the at least one operational parameter, that are adjustable to control an amount of power consumption of the wireless transceiver; and
    transmitting, to the remote terminal, information regarding the plurality of operational parameters as the second information.

4. The method of claim 3, wherein the identifying of the plurality of operational parameters of the wireless transceiver comprises identifying the plurality of operational parameters associated with a transmitter section of the wireless transceiver.

5. The method of claim 3, wherein the identifying of the plurality of operational parameters of the wireless transceiver comprises identifying the plurality of operational parameters associated with a receiver section of the wireless transceiver.

6. The method of claim 1, wherein the third information comprises a respective range of values for each of the at least one operational parameter of the wireless transceiver.

7. The method of claim 1, wherein the controlling of the at least one operational parameter of the wireless transceiver of the mobile terminal comprises controlling a transmitter section of the wireless transceiver in terms of bandwidth, modulation, error correction coding, transmit power, scheduling, or a combination thereof.

8. The method of claim 1, wherein the controlling of the at least one operational parameter of the wireless transceiver of the mobile terminal comprises controlling a receiver section of the wireless transceiver in terms of bandwidth, modulation, error correction coding, scheduling, or a combination thereof.

9. The method of claim 1, wherein the information about the data to be transmitted to or from the mobile terminal comprises information about one or more data streams and contents of the one or more data streams transmitted to and from the mobile terminal.

10. The method of claim 1, wherein the one or more wireless communication variables comprise one or more bandwidth requirements, a quality of a radio link for wireless transmission to and from the mobile terminal, or a combination thereof.

11. A method of controlling power consumption of a plurality of mobile terminals, comprising:
    wirelessly receiving respective second information from each of the plurality of mobile terminals, the respective second information related to respective first information on two or more aspects of a plurality of aspects of the respective mobile terminal sensed by corresponding at least one sensor;

selecting at least one operational parameter for the plurality of mobile terminals based on a combination of the second information received from the plurality of mobile terminals, information about data to be transmitted to or from the plurality of mobile terminals, and one or more wireless communication variables, the at least one operational parameter being associated with a respective wireless transceiver of each of the plurality of mobile terminals and adjustable to control an amount of power consumption of the respective wireless transceiver; and wirelessly transmitting information about the at least one operational parameter as third information to the plurality of mobile terminals, wherein the plurality of aspects comprise a charge level of a power supply of the respective mobile terminal, a temperature of the power supply, and an amount of passage of time since the power supply was previously charged by an external power supply.

12. The method of claim 11, wherein the at least one sensor corresponding to each of the plurality of mobile terminals comprises one or more sensors of a plurality of sensors, the plurality of sensors comprising:

a charge sensor configured to sense the charge level of the power supply of the respective mobile terminal;

a temperature sensor configured to sense the temperature of the power supply;

a timer configured to measure the amount of passage of time since the power supply was previously charged by the external power supply;

a transmit power sensor configured to measure an amount of radio frequency (RF) power emitted by a transmitter section of the respective wireless transceiver of the respective mobile terminal; and a location sensor configured to determine a geographic location of the respective mobile terminal.

13. The method of claim 11, wherein the third information comprises a respective range of values for each of the at least one operational parameter associated with the respective wireless transceiver of each of the plurality of mobile terminals.

14. The method of claim 11, wherein the at least one operational parameter comprises one or more operational parameters associated with a transmitter section of the respective wireless transceiver of each of the plurality of mobile terminals in terms of bandwidth, modulation, error correction coding, transmit power, scheduling, or a combination thereof.

15. The method of claim 11, wherein the at least one operational parameter comprises one or more operational parameters associated with a receiver section of the respective wireless transceiver of each of the plurality of mobile terminals in terms of bandwidth, modulation, error correction coding, scheduling, or a combination thereof.

16. An apparatus, comprising:

a wireless transceiver comprising a transmitter section configured to wirelessly transmit data and a receiver section configured to wirelessly receive data;

a power supply configured to store a charge of electricity and power the wireless transceiver;

at least one sensor coupled to sense two or more aspects of a plurality of aspects of the apparatus; and a processor coupled to the wireless transceiver, the processor configured to perform operations comprising:

receiving first information from the at least one sensor regarding the two or more aspects of the apparatus sensed by the at least one sensor, the plurality of aspects comprising a charge level of the power supply, a temperature of the power supply, and an amount of passage of time since the power supply was previously charged by an external power supply;

transmitting, via the wireless transceiver, second information related to the first information;

receiving, via the wireless transceiver, third information related to the second information, information about data to be transmitted to or from the wireless transceiver, one or more wireless communication variables, or a combination thereof; and controlling at least one operational parameter of the wireless transceiver based on the third information.

17. The apparatus of claim 16, wherein the at least one sensor comprises one or more sensors of a plurality of sensors, the plurality of sensors comprising:

a charge sensor configured to sense the charge level of the power supply;

a temperature sensor configured to sense the temperature of the power supply;

a timer configured to measure the amount of passage of time since the power supply was previously charged by the external power supply;

a transmit power sensor configured to measure an amount of radio frequency (RF) power emitted by the transmitter section of the wireless transceiver; and a location sensor configured to determine a geographic location of the apparatus.

18. The apparatus of claim 16, wherein, in transmitting the second information to the remote terminal, the processor is configured to perform operations comprising:

identifying, based on the first information, a plurality of operational parameters associated with either or both of the transmitter section and the receiver section of the wireless transceiver, including the at least one operational parameter, that are adjustable to control an amount of power consumption of the wireless transceiver; and transmitting, via the wireless transceiver, information regarding the plurality of operational parameters as the second information.

19. The apparatus of claim 16, wherein the third information comprises a respective range of values for each of the at least one operational parameter of the wireless transceiver, wherein the information about the data to be transmitted to or from the wireless transceiver comprises information about one or more data streams and contents of the one or more data streams transmitted to and from the wireless transceivers, and wherein the one or more wireless communication variables comprise one or more bandwidth requirements, a quality of a radio link for wireless transmission to and from the wireless transceiver, or a combination thereof.

20. The apparatus of claim 16, wherein, in controlling the at least one operational parameter of the wireless transceiver, the processor is configured to control either or both of the transmitter section and the receiver section of the wireless transceiver in terms of one or more of bandwidth, modulation, error correction coding, transmit power, and scheduling.

* * * * *